(12) United States Patent
Hristov

(10) Patent No.: US 7,366,336 B2
(45) Date of Patent: Apr. 29, 2008

(54) SYSTEM TO LINK PERIODIC X-RAY IMAGES

(75) Inventor: Dimitre Hristov Hristov, Pleasant Hill, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 724 days.

(21) Appl. No.: 10/796,327

(22) Filed: Mar. 9, 2004

(65) Prior Publication Data

US 2005/0201603 A1 Sep. 15, 2005

(51) Int. Cl.
*G06K 9/00* (2006.01)

(52) U.S. Cl. ...................... 382/131; 382/284

(58) Field of Classification Search ................ 382/128, 382/129, 130, 131, 132, 133, 134, 284; 378/4, 378/21, 23, 24, 26, 27, 98.6, 98.9, 101, 901; 600/407, 410, 425, 411; 128/922
See application file for complete search history.

(56) References Cited

U.S. PATENT DOCUMENTS

| 5,329,567 | A | * | 7/1994 | Ikebe ......................... 378/20 |
| 5,383,231 | A | | 1/1995 | Yamagishi |
| 5,412,582 | A | | 5/1995 | Nambu et al. |
| 6,051,376 | A | | 4/2000 | Fisher et al. |
| 6,214,544 | B1 | | 4/2001 | Fisher |
| 6,381,487 | B1 | | 4/2002 | Flohr et al. |
| 6,426,987 | B2 | * | 7/2002 | Nakamura et al. ............. 378/4 |
| 6,522,712 | B1 | * | 2/2003 | Yavuz et al. .................... 378/4 |
| 6,535,570 | B2 | | 3/2003 | Stergiopoulos et al. |
| 6,546,072 | B1 | * | 4/2003 | Chalmers ..................... 378/57 |
| 6,563,941 | B1 | * | 5/2003 | O'Donnell et al. ......... 382/131 |
| 6,623,922 | B1 | | 9/2003 | Kamb et al. |
| 6,780,152 | B2 | * | 8/2004 | Ustuner et al. ............. 600/443 |
| 6,842,502 | B2 | * | 1/2005 | Jaffray et al. ................. 378/65 |
| 6,865,248 | B1 | | 3/2005 | Rasche et al. |
| 7,054,406 | B2 | * | 5/2006 | Ikeda et al. ..................... 378/8 |
| 7,158,610 | B2 | * | 1/2007 | Mostafavi ................ 378/98.12 |

OTHER PUBLICATIONS

Smith, et al. Genetic Footprinting: A Genomic Strategy for Determining a Gene's Function Given its Sequence, *Proc. Natl. Acad. Sci. USA*, vol. 92, pp. 6479-6483 (1995).

Adi Kimchi, Cytokine Triggered Molecular Pathways That Control Cell Cycle Arrest, *Journal of Cellular Biochemistry*, vol. 50, pp. 1-9, (1992).

Deiss, et al., Cathepsin D. Protease Mediates Programmed Cell Death Induced by Interferon-y, Fas/APO-1 and TNF-o, *The EMBO Journal*, vol. 15, No. 15, pp. 3861-3870 (1996).

(Continued)

*Primary Examiner*—Samir Ahmed
*Assistant Examiner*—Abolfazl Tabatabai

(57) ABSTRACT

A system includes acquisition of a plurality of images of a first portion of a body undergoing substantially periodic motion, acquisition of a second plurality of images of a second portion of the body, the second portion comprising a portion of the first portion, and determination of a correlation between at least one of the first plurality of images and at least one of the second plurality of images. A system may also include generation of a combined image of the first portion and the second portion based on the at least one of the first plurality of images and the at least one of the second plurality of images, the combined image corresponding to a first phase of the periodic motion.

26 Claims, 13 Drawing Sheets

OTHER PUBLICATIONS

Lisitsyn, et al., Comparative Genomic Analysis of Tumors: Detection of DNA Losses and Amplification, *Proc. Natl. Acad. Sci. USA*, vol. 92, pp. 151-155, (1995).

Yancopoulos, et al., Isolation of Coordinately Regulated Genes that are Expressed in Discrete Stages of B-Cell Development, *Proc. Natl. Acad. Sci. USA*. vol. 87, pp. 5759-5763 (1990).

Lee, et al., Positive Selection of Candidate Tumor-Suppressor Genes by Subtractive Hybridization, *Proc. Natl. Acad. Sci. USA*, vol. 88. pp. 2825-2829 (1991).

Diatchenko, et al., Suppression Subtractive Hybridization: A Method for Generating Differentially Regulated or Tissue-Specific cDNA Probes and Libraries, *Proc. Natl. Acad. Sci. USA*, vol. 93. pp. 6025-6030 (1996).

Hybank, et al., Identifying Differences in mRNA Expression by Representational Difference Analysis of cDNA, *Nucleic Acids Research*, vol. 22, No. 25, pp. 5640-5648 (1994).

Braun, et al., Identification of Target Genes for the Ewing's Sarcoma EWS/FLI Fusion Protein by Representational Difference Analysis, *Molecular and Cellular Biology*, vol. 15, No. 8, pp. 4623-4630 (1995).

Gudkov, et al., Isolation of genetic Suppressor Elements, Inducing Resistance to Topoismerase II-Interactive Cytotoxic Drugs, From Human Topoisomerase II cDNA, *Proc. Natl. Acad. Sci. USA*, vol. 90, pp. 3231-3235 (1993).

Gudkov, et al., Cloning Mammalian Genes by Expression Selection of Genetic Suppressor Elements: Association of Kinesin With Drug Resistance and Cell Immortalization, *Proc. Natl. Acad. Sci. USA*, vol. 91, pp. 3744-3749 (1994).

Kissil, et al., Isolation of DAP3, Novel Mediator of Interferon-y-Induced Cell Death, *The Journal of Biological Chemistry*, vol. 270, No. 46, pp. 27932-27936 91995).

* cited by examiner

SYSTEM TO LINK PERIODIC X-RAY IMAGES

CROSS-REFERENCE TO RELATED APPLICATIONS

The present application is related to commonly-assigned, co-pending U.S. patent application Ser. Nos. 10/796,733, entitled "Time-based System to Link Periodic X-Ray Images", filed concurrently herewith.

BACKGROUND

1. Field

The embodiments described below relate generally to imaging, and may be applied to systems for generating in vivo images.

2. Description

Computed tomography (CT) systems are commonly used to generate images of an internal portion of a body. Generally, a CT system includes an X-ray source and a radiation receiver that are mounted to face one another on opposite sides of a ring. A body is positioned within the ring so that a portion of interest lies between the X-ray source and the radiation receiver. The X-ray source then emits X-ray radiation that passes through the portion of interest and is received by the radiation receiver.

The receiver produces a set of data that represent the attenuative properties of tissues that lie between the X-ray source and the receiver. This set of data comprises a projection image. The ring is then rotated in order to rotate the X-ray source and the radiation receiver around the portion of interest. During the rotation, the X-ray source transmits radiation toward the receiver and the receiver produces projection images corresponding to various rotational angle positions. A three-dimensional image may be generated from the projection images using known reconstruction techniques.

Most reconstruction techniques assume that the spatial distribution of the portion of interest's linear attenuation coefficient is identical for all projections. This assumption does not hold if the portion of interest is in motion during acquisition of the projection images. Therefore, in the case of periodic motion (e.g., resulting from breathing motion, heart beat, etc.), some reconstruction methods attempt to acquire projection images that each correspond to a same phase of the motion.

A common approach to acquire such projection images includes time-stamping the projection images during their acquisition and extracting subsets of the images such that each image in a subset corresponds to the same phase. The subsets are extracted by comparing the time-stamps of the images with an external temporal physiological or anatomical signal that is measured with an external device. An image may be reconstructed for a phase using the subset of projection images that corresponds to the phase. Moreover, images for several phases may be reconstructed and combined into an animated image showing movement of the portion of interest over several phases.

The above approach assumes that the temporal pattern of the signals is representative of the temporal pattern of the periodically moving anatomy. Accordingly, such approaches may not provide required accuracy. In addition, these approaches require additional devices for monitoring the physiological or anatomical signal, some discomfort due to the attachment of the monitoring devices to the patient, and/or additional time for patient setup.

SUMMARY

To address at least the foregoing, some embodiments provide a system, method, apparatus, and means to acquire a first plurality of images of a first portion of a body undergoing substantially periodic motion, acquire a second plurality of images of a second portion of the body, the second portion comprising a portion of the first portion, determine a correlation between at least one of the first plurality of images and at least one of the second plurality of images, and generate a combined image of the first portion and the second portion based on the at least one of the first plurality of images and the at least one of the second plurality of images, the combined image corresponding to a first phase of the periodic motion.

In some aspects, the first plurality of images and the second plurality of images comprise three-dimensional cross-sectional images of the body. Further aspects may determine the correlation via a determination that the at least one of the first plurality of images and the at least one of the second plurality of images represent substantially a same phase of the periodic motion.

According to additional aspects, a second correlation is determined between a second at least one of the first plurality of images and a second at least one of the second plurality of images, and a second combined image of the first portion and the second portion is generated based on the second at least one of the first plurality of images and the second at least one of the second plurality of images, the second combined image corresponding to a second phase of the periodic motion.

Further aspects may include acquisition of a third plurality of images of a third portion of the body, the third portion comprising a next portion of the second portion, determination of a correlation between a second at least one of the second plurality of images and at least one of the third plurality of images, and generation a combined image of the second portion and the third portion based on the second at least one of the second plurality of images and the at least one of the third plurality of images, the combined image of the second portion and the third portion corresponding to a second phase of the periodic motion.

Moreover, aspects may include acquisition of a third plurality of images of a third portion of the body, the third portion comprising a next portion of the second portion, determination of a correlation between the at least one of the second plurality of images and at least one of the third plurality of images, and generation of a combined image of the second portion and the third portion based on the at least one of the second plurality of images and the at least one of the third plurality of images, the combined image of the second portion and the third portion corresponding to the first phase of the periodic motion.

The claimed invention is not limited to the disclosed embodiments, however, as those in the art can readily adapt the description herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts, and wherein.

DETAILED DESCRIPTION

The following description is provided to enable any person skilled in the art to make and use the claimed invention and sets forth the best mode contemplated by the inventors for carrying out the claimed invention. Various modifications, however, will remain readily apparent to those in the art.

Figure 1:
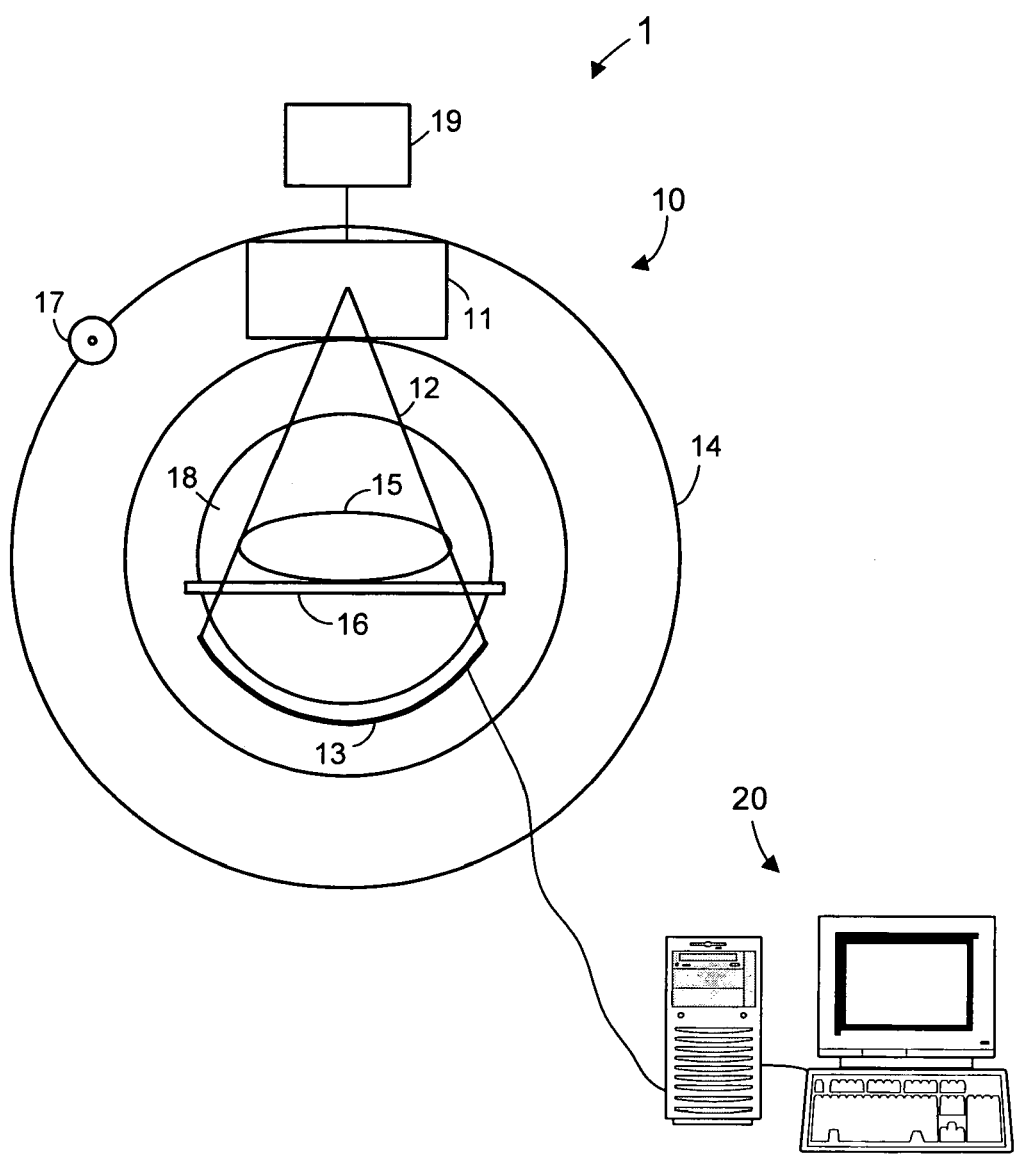
FIG. 1 is a diagram illustrating an image acquisition system according to some embodiments.

FIG. 1 illustrates CT system 1 according to some embodiments. CT scanner 10 is located in a CT room and may be used to generate images of a body according to some embodiments. CT scanner 10 includes X-ray source 11 for emitting fan-shaped X-ray beam 12 toward radiation receiver 13. Both X-ray source 11 and radiation receiver 13 are mounted on ring 14 such that they may be rotated through 360 degrees while maintaining the physical relationship therebetween.

In general operation, body 15 is positioned on bed 16 to place a portion of the body between X-ray source 11 and radiation receiver 13. Next, X-ray source 11 and receiver 13 are rotated by rotation drive 17 around cavity 18 in which body 15 lies. During this rotation, X-ray source 11 is powered by high-voltage generator 19 to transmit X-ray radiation toward receiver 13. X-ray source 11 transmits the radiation toward receiver 13 at some or all projection angles and receiver 13 produces a set of data for each projection angle. The sets of data may be considered images of the portion of body 15 that are acquired at each projection angle.

Each set of data is transmitted to computer system 20. Computer system 20 calculates attenuation coefficients (e.g., Hounsfield numbers) of predetermined points based on the data sets. Accordingly, the data represents the attenuative properties of tissues at each point of the represented portions. The attenuation coefficients may be used to generate an image representing the portion of body 15 that lies between X-ray source 11 and radiation receiver 13.

Figure 2:
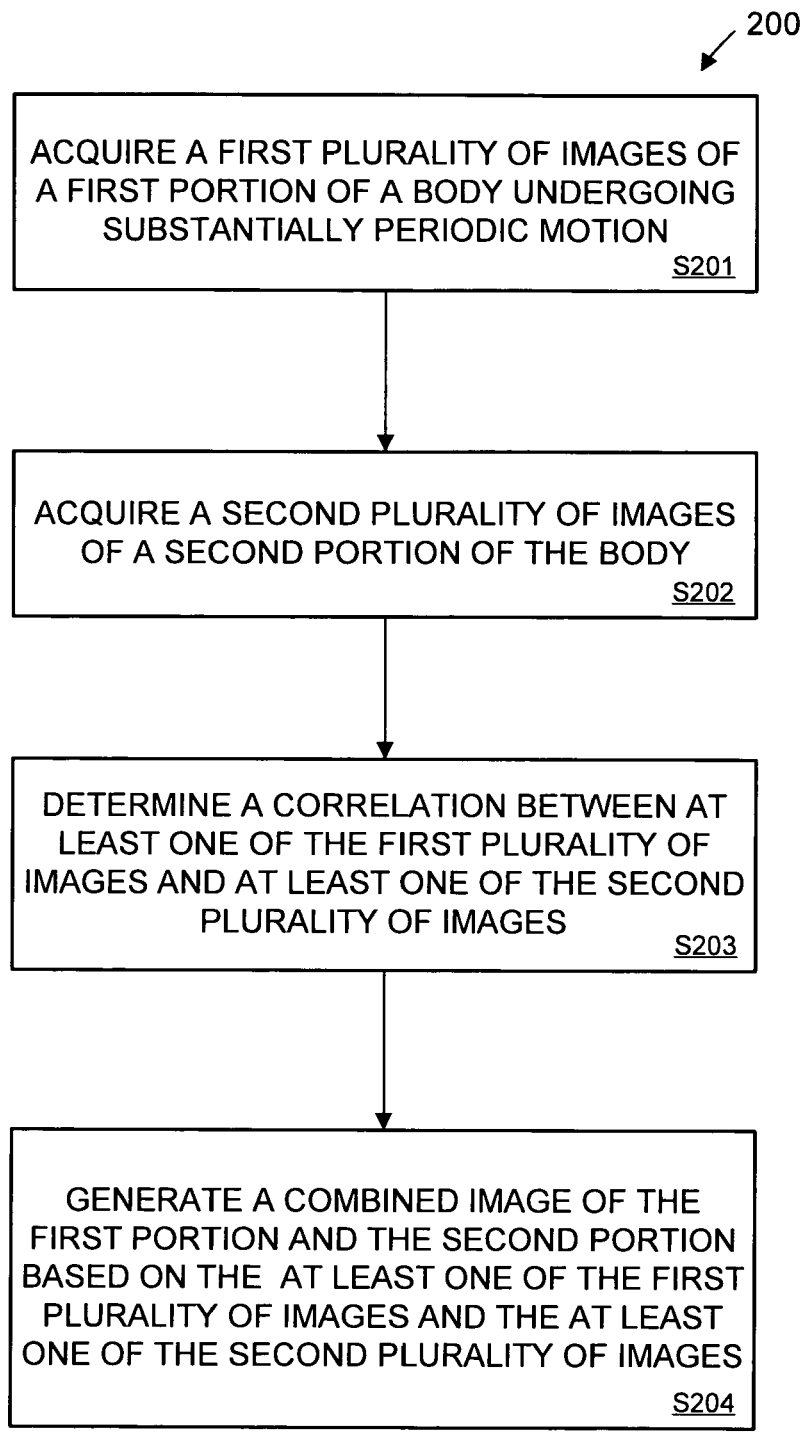
FIG. 2 comprises a flow diagram illustrating process steps according to some embodiments.

FIG. 2 is a flow diagram of process steps 200 executed by system 1 according to some embodiments. Process steps 200 may be used to generate an image of a body in motion according to some embodiments. Process steps 200 may be embodied, in whole or in part, by hardware of and/or software executed by elements including but not limited to those of CT scanner 10 and computer system 20. Software embodying process steps 200 may be stored by any medium, including a fixed disk, a floppy disk, a CD-ROM, a DVD-ROM, a Zip™ disk, a magnetic tape, or a signal. Some or all of such software may also be stored in one or more devices.

A first plurality of images is initially acquired at step S201. The first plurality of images represent a first portion of a body undergoing substantially periodic motion. In some embodiments, the body is a living being and the periodic motion results from physiological process such as heartbeat and/or respiration.

The first plurality of images may comprise three-dimensional cross-sectional images of the first portion of the body. For example, the images may represent a cross-section of the first portion of the body taken perpendicular to the major axis of bed 16. The images may be acquired using currently- or hereafter-known techniques for reconstructing the sets of data acquired by receiver 13 as described above. According to some embodiments, the reconstruction may be performed by CT scanner 10 and/or computer system 20.

Figure 3:
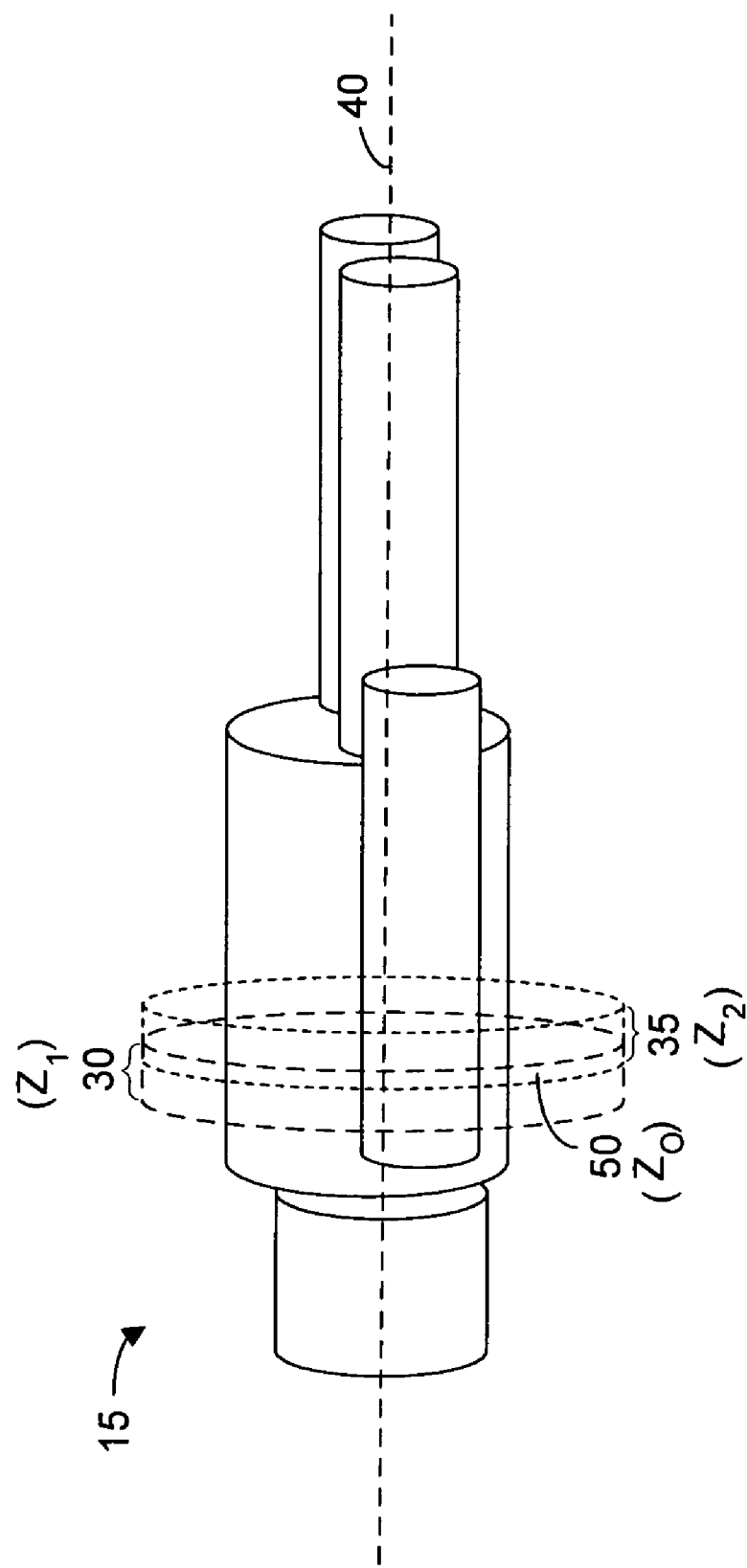
FIG. 3 illustrates two portions of a body that are imaged according to some embodiments.
Figure 4:
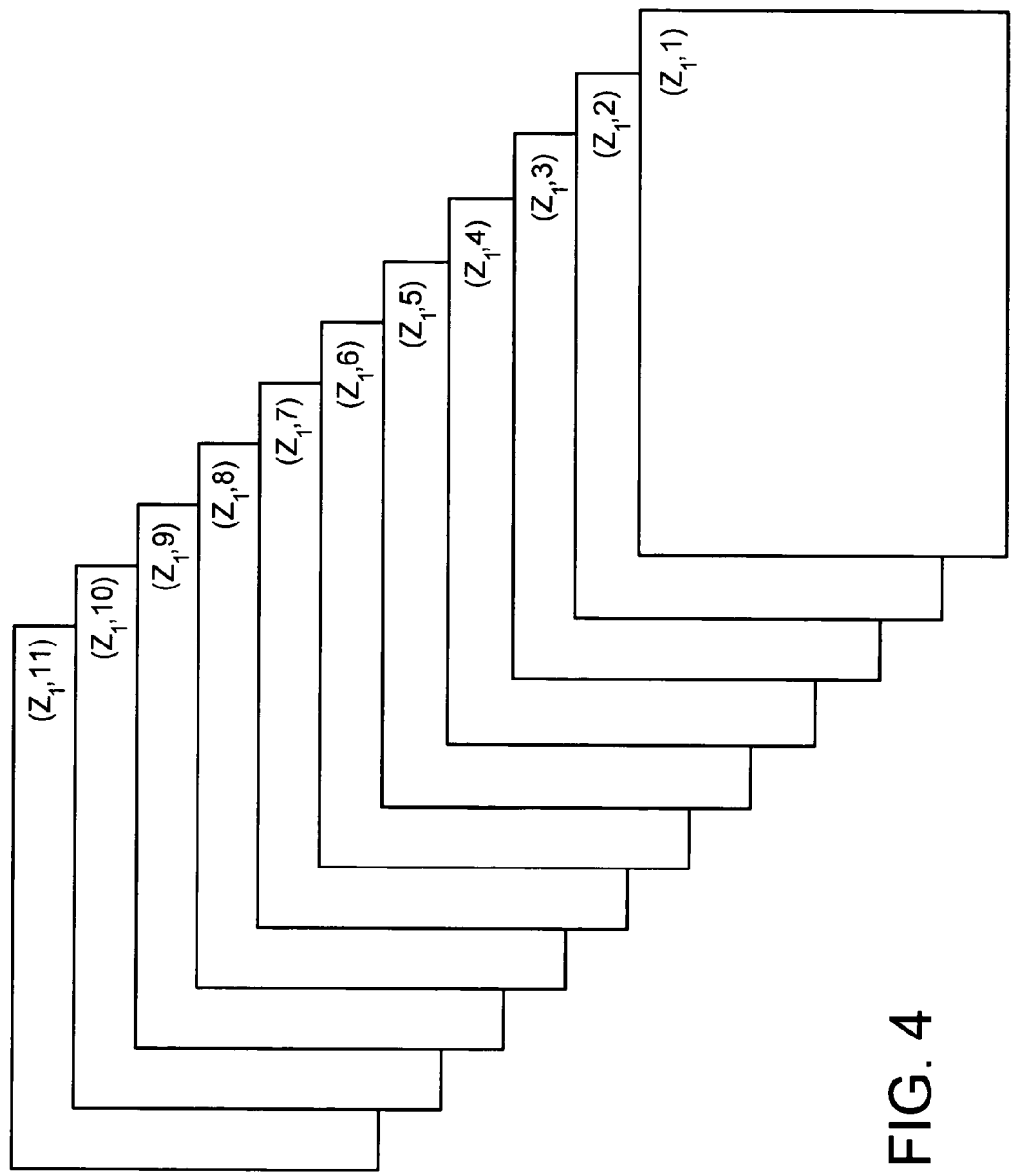
FIG. 4 includes representations of a plurality of images acquired according to some embodiments.

A first portion of a body according to some embodiments is illustrated in FIG. 3. FIG. 3 shows body 15 that is undergoing periodic motion, and first portion 30 is illustrated as a cylindrical volume. FIG. 4 includes representations of the first plurality of images according to some embodiments. Each image is associated with a (position, sequence) coordinate. The position value associated with a particular image indicates the Z positions along axis 40 that are represented by the particular image, and the sequence value indicates an order in which the image was acquired. In some embodiments, the images described herein are not cross-sectional images.

A second plurality of images of a second portion of a body is acquired in step S202. FIG. 3 also shows second portion 35, which, like first portion 30, is a cylindrical volume that shares axis 40 with body 15. Second portion 35 of FIG. 3 also includes overlap portion 50 of first portion 30. Accordingly, overlap portion 50 is a cylindrical volume having axis 40 and that is included within first portion 30 and second portion 35.

In some embodiments, the first plurality of images and the second plurality of images may be acquired in a manner that prevents overlap portion 50 from receiving double the amount of radiation received by other portions of portion 30 and portion 35 during process steps 200. Attenuating materials may be positioned to intercept the periphery of X-ray beam 12 according to some techniques for accomplishing the foregoing.

Figure 5:
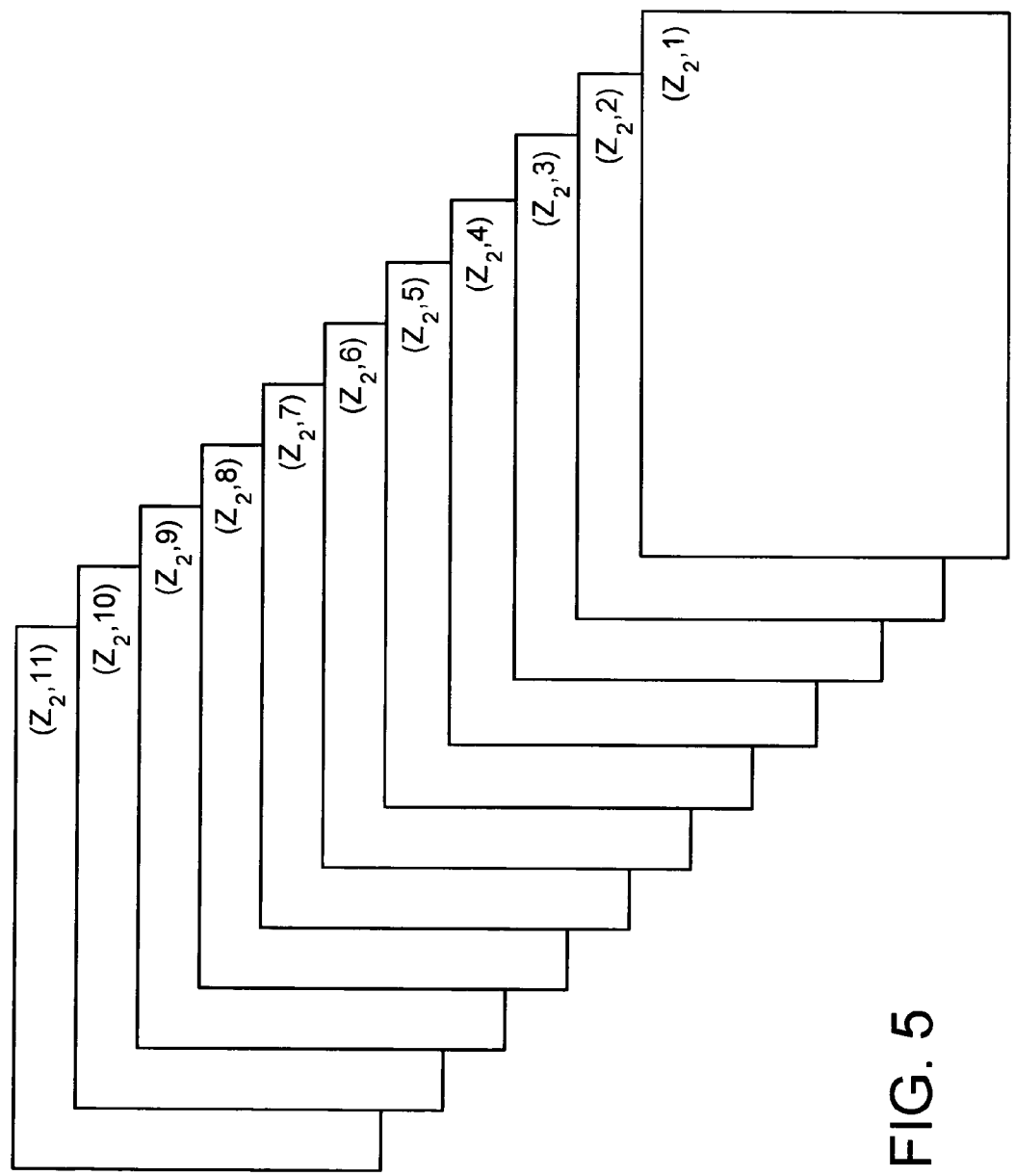
FIG. 5 includes representations of a plurality of images acquired according to some embodiments.

FIG. 5 includes representations of the second plurality of images according to some embodiments. Like the FIG. 4 images, each image is associated with a (position, sequence) coordinate. The position value associated with each illustrated image indicates that the images represent a range of Z positions that are different from the range of Z positions represented by the FIG. 4 images. As described above, the Z positions represented by the FIG. 4 images and the Z positions represented by the FIG. 5 images both include the Z positions of overlap portion 50. The Z positions of overlap portion 50 will be designated as $Z_o$ herein.

Next, in step S203, a correlation is determined between at least one of the first plurality of images and at least one of the second plurality of images. Any image similarity measure may be used in the determination of step S203, including but not limited to an absolute value of pixel differences and cross-correlation. The correlation may comprise determining that the at least one of the first plurality of images and the at least one of the second plurality of images represent substantially a same phase of the periodic motion.

Figure 6:
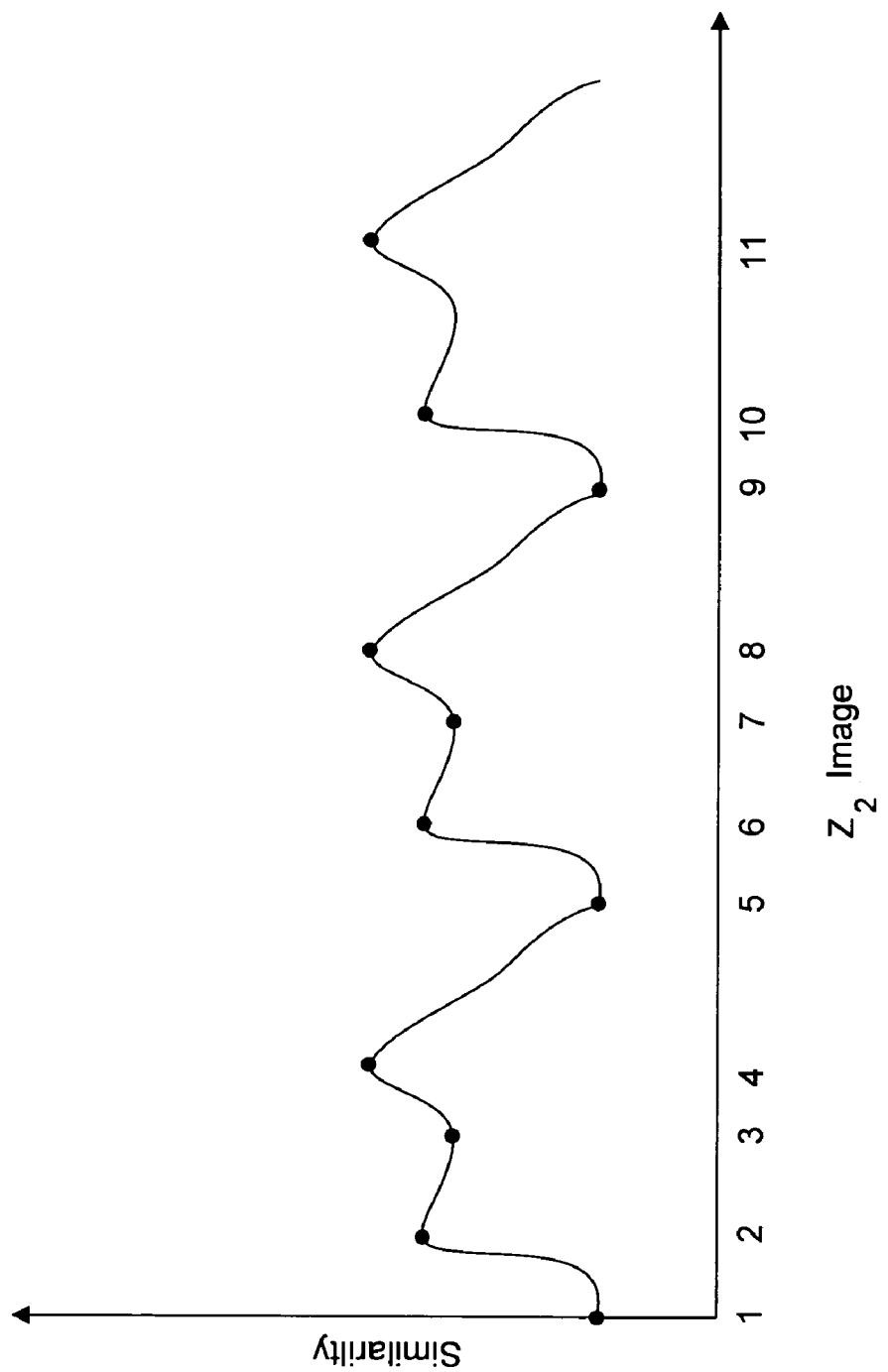
FIG. 6 is a waveform depicting similarity measures between images according to some embodiments.

In some embodiments, the correlation is determined by determining a similarity measure between overlap portion 50 as represented in a first one of the FIG. 4 images and overlap portion 50 as represented in each of the FIG. 5 images. FIG. 6 is a graph showing a similarity of these images according to some embodiments. A highest similarity is shown for images $(Z_2, 4)$, $(Z_2, 8)$, and $(Z_2, 11)$. Therefore, a correlation is determined between images $(Z_1, 1)$, $(Z_2, 4)$, $(Z_2, 8)$, and $(Z_2, 11)$ in step S203.

The correlation indicates that overlap portion 50 is substantially identically represented in images $(Z_1, 1)$, $(Z_2, 4)$, $(Z_2, 8)$, and $(Z_2, 11)$. Therefore, it is assumed that images $(Z_1, 1)$, $(Z_2, 4)$, $(Z_2, 8)$, and $(Z_2, 11)$ represent substantially a same phase of the periodic motion.

A combined image of the first portion of the body and of the second portion of the body is generated in step S204. The combined image may be generated based on the images for which a correlation was determined in step S203. Using the above example, a combined image may be generated based on images $(Z_1, 1)$ and $(Z_2, 4)$. As shown in FIG. 3, the range of Z positions indicated by $Z_1$ and by $Z_2$ both include the Z positions $(Z_o)$ of overlap portion 50. Images $(Z_1, 1)$ and $(Z_2, 4)$ may therefore be "stitched" together to generate a combined image using overlap portion 50 as a common reference. The combined image may be generated using any currently- or hereafter-known methods for combining two or more images.

Figure 7:
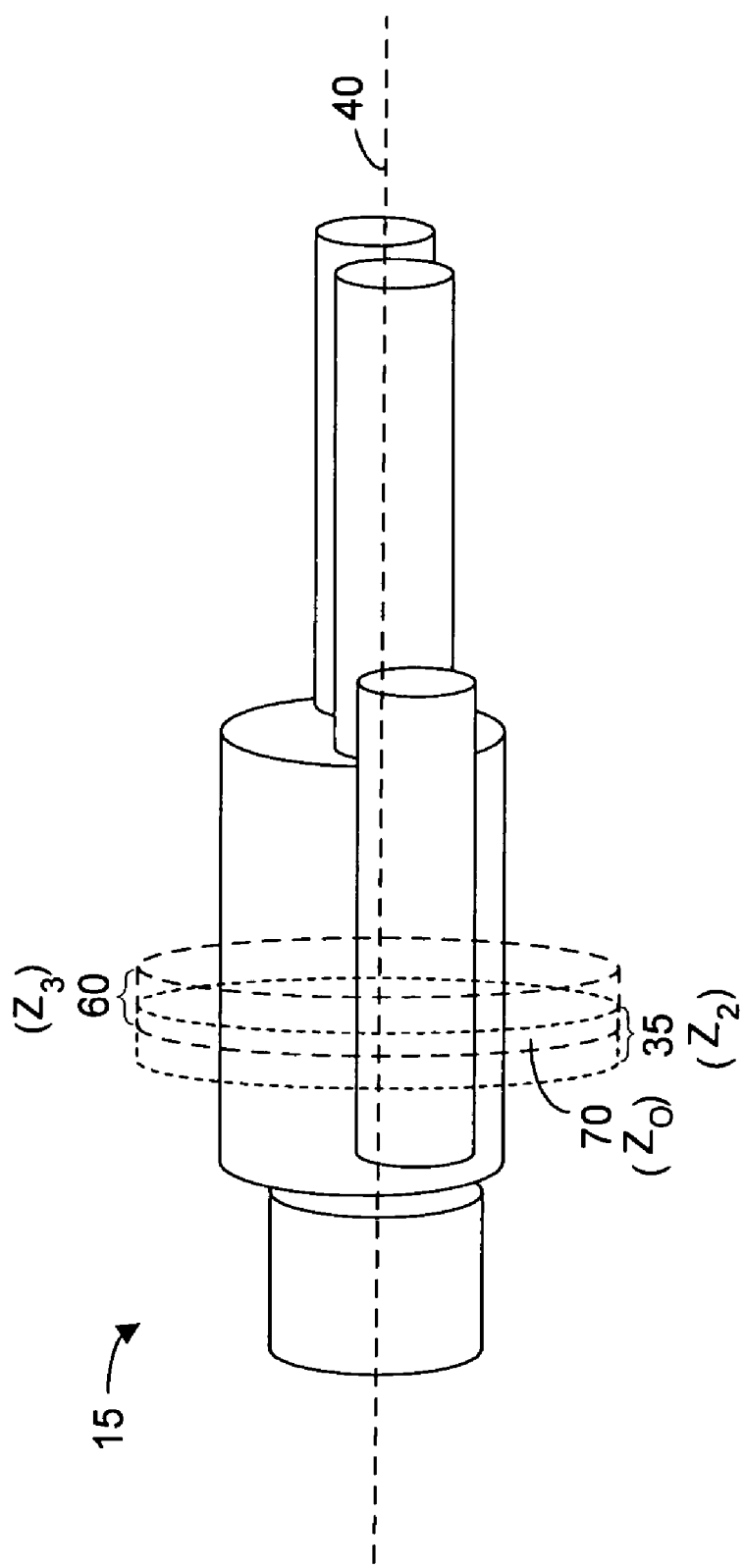
FIG. 7 illustrates two portions of a body that are imaged according to some embodiments.

According to some embodiments, a next plurality of images is acquired of a third portion representing a third range of Z positions. FIG. 7 illustrates third portion 60 that spans a range of Z locations indicated by $Z_3$. Third portion 60 and second portion 35 both include overlap portion 70. More specifically, Z positions $Z_2$ and $Z_3$ both include Z position $Z_o$.

A correlation may be determined between one of the FIG. 5 images representing Z positions $Z_2$ and the next plurality of images representing Z positions $Z_3$ as described above with respect to step S203. The correlation may be based on similarities between overlap portion 70 as represented in the one of the FIG. 5 images and overlap portion 70 as represented in each of the next plurality of images. The correlated images may represent second portion 35 and third portion 60 during a first phase of motion.

Next, as described with respect to step S204, a combined image may be generated based on the images for which a correlation was determined. Continuing the above example, a combined image may be generated based on image $(Z_2, 4)$ and on an image representing Z positions $Z_3$ that is correlated to image $(Z_2, 4)$. The two images may be combined using overlap portion 70 as a common reference. Further, the combined image may be combined with the combined image that was generated based on images $(Z_1, 1)$ and $(Z_2, 4)$ in order to generate an image representing the first portion, the second portion and the third portion in a first phase of motion. Such a combination may be facilitated by the fact that both combined images are based on image $(Z_2, 4)$.

Process steps 200 may therefore provide, in some embodiments, the generation of a composite image of an object undergoing periodic motion from images representing portions of the object. In addition, some embodiments do not require the use of monitors to obtain synchronization signals from the object.

Figure 8:
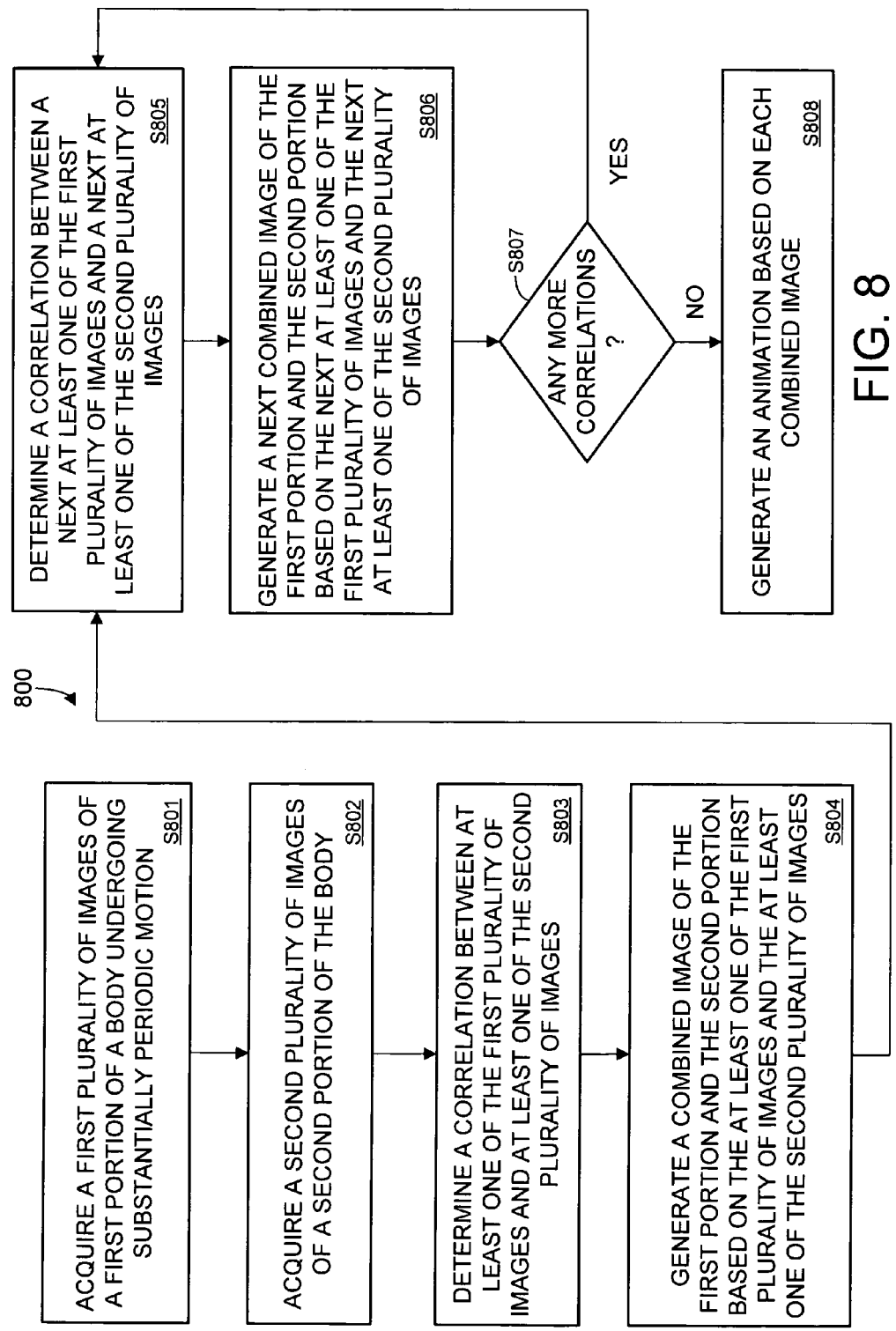
FIG. 8 comprises a flow diagram illustrating process steps according to some embodiments.

FIG. 8 is a flow diagram of process steps 800 executed by system 1 according to some embodiments. Process steps 800 may be used to combine images of different portions of a body undergoing periodic motion according to some embodiments. Process steps 800 may be embodied as described above with respect to process steps 200.

Initially, at step S801, a first plurality of images of a first portion of a body undergoing substantially periodic motion is acquired. A second plurality of images of a second portion of the body is acquired in step S802. The images may be acquired in steps S801 and S802 as described above with respect to steps S201 and S202, respectively. According to some embodiments of step S802, a relative position of body 15 with respect to X-ray source 11 and radiation receiver 13 is changed such that the second portion of body 15 is positioned between source 11 and receiver 13. X-ray source 11 and radiation receiver 13 are then rotated and operated as described above to acquire a plurality of images of the second portion of the body.

A correlation is then determined between at least one of the first plurality of images and at least one of the second plurality of images in step S803. As mentioned with respect to step S203, the correlation may comprise a determination that the at least one of the first plurality of images and the at least one of the second plurality of images represent substantially a same phase of the periodic motion. In a case that the images of FIGS. 4 and 5 were acquired in steps S801 and S802, it will be assumed for purposes of the present example that a correlation is determined between images $(Z_1, 1)$, $(Z_1, 5)$, $(Z_1, 9)$, $(Z_2, 4)$, $(Z_2, 8)$, and $(Z_2, 11)$.

The correlation indicates that overlap portion 50 is substantially identically represented in each of the six images. Accordingly, each of the six images may represent a same phase of periodic motion.

Figure 9:
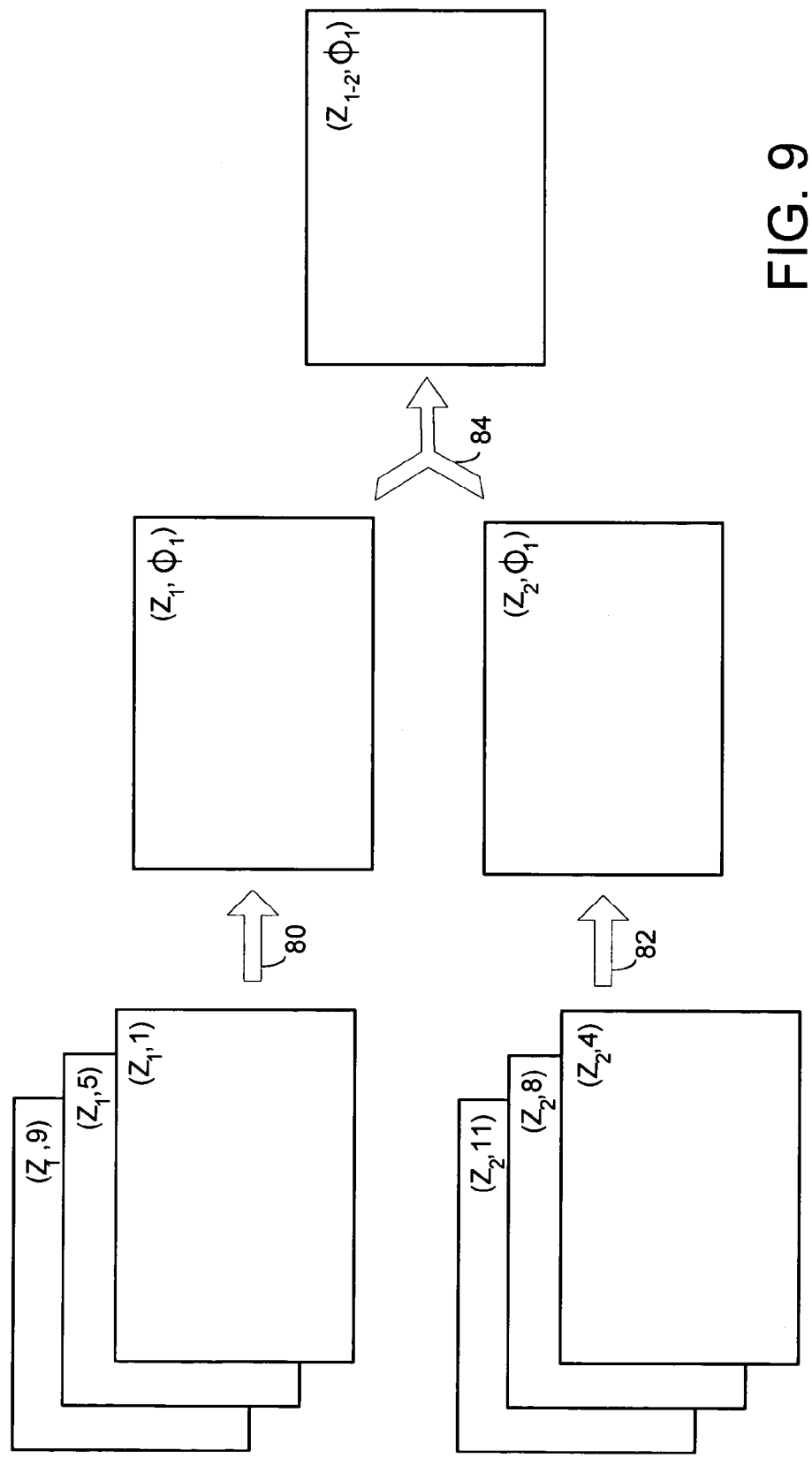
FIG. 9 depicts the combination of a plurality of images to generate a combined image according to some embodiments.

A combined image of the first portion of the body and of the second portion of the body is generated in step S804 based on the at least one of the first plurality of images and the at least one of the second plurality of images. FIG. 9 illustrates the generation of a combined image according to some embodiments of step S804. Arrow 80 indicates the combination of images $(Z_1, 1)$, $(Z_1, 5)$, and $(Z_1, 9)$ into combined image $(Z_1, \phi_1)$ of first portion 30.

Combined image $(Z_1, \phi_1)$ is labeled to indicate that it corresponds to a first phase of the periodic motion because each of its component images substantially represents a same phase of the periodic motion of body 15. Combined image $(Z_1, \phi_1)$ may be generated to produce an image that is of higher quality than any of its component images. In this regard, each of the images acquired in steps S802 and S803 may be acquired using a lower X-ray power than would typically be used to acquire an image.

Arrow 82 indicates the combination of images $(Z_2, 4)$, $(Z_2, 8)$, and $(Z_2, 11)$ into combined image $(Z_2, \phi_1)$. Combined image $(Z_2, \phi_1)$ is also labeled to indicate that it corresponds to the first phase of the periodic motion because each of its component images substantially represents a same phase. Next, arrow 84 indicates the combination of image $(Z_1, \phi_1)$ with image $(Z_2, \phi_1)$ to generate combined image $(Z_{1-2}, \phi_1)$.

The range of Z positions indicated by $Z_1$ and by $Z_2$ both include the Z positions $(Z_o)$ of overlap portion 50. Images $(Z_1, \phi_1)$ and $(Z_2, \phi_1)$ may therefore be combined using overlap portion 50 as a common reference. The combined image may be generated using any currently- or hereafter-known methods for combining two or more images. Combined image $(Z_{1-2}, \phi_1)$ is labeled to indicate that it corresponds to the first phase of the periodic motion. The label also indicates that image $(Z_{1-2}, \phi_1)$ represents the first portion and the second portion of body 15 as positioned during the first phase of motion.

A correlation may then be determined between a next at least one of the first plurality of images and a next at least one of the second plurality of images in step S805. For example, a correlation may be determined between images $(Z_1, 2)$, $(Z_1, 6)$, $(Z_1, 10)$, $(Z_2, 3)$, $(Z_2, 7)$, and $(Z_2, 10)$. The correlation may be determined by determining that overlap portion 50 is substantially identically represented in each of the six images. The correlation of images $(Z_1, 2)$, $(Z_1, 6)$, $(Z_1, 10)$, $(Z_2, 3)$, $(Z_2, 7)$, and $(Z_2, 10)$ indicates that each image corresponds to substantially a same phase of the periodic motion.

Figure 10:
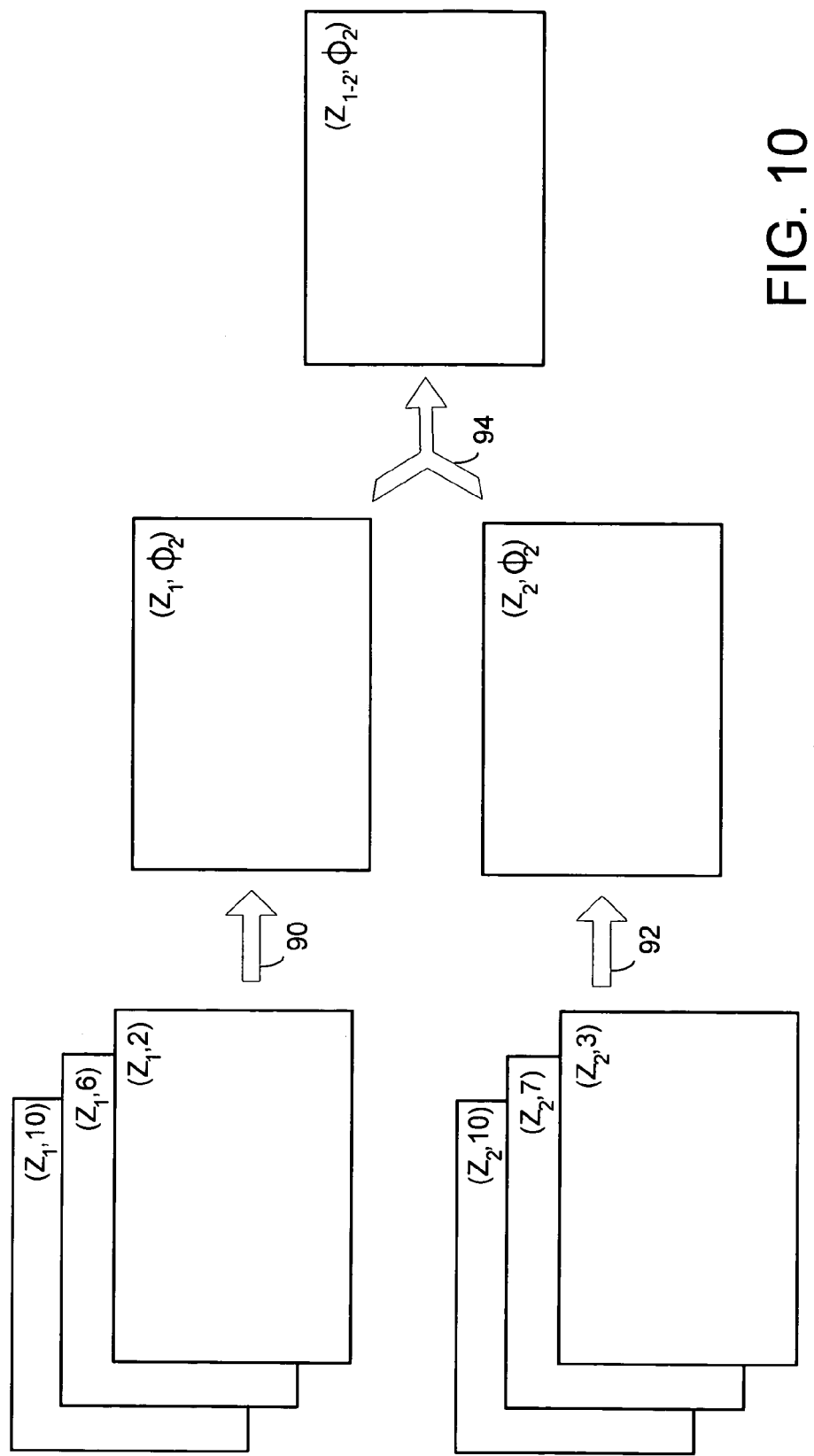
FIG. 10 depicts the combination of a plurality of images to generate a combined image according to some embodiments.

A combined image of the first portion of the body and of the second portion of the body may be generated in step S806 based on the correlated images. A combination according to some embodiments of step S806 is shown in FIG. 10. More specifically, arrow 90 indicates the combination of images $(Z_1, 2)$, $(Z_1, 6)$, and $(Z_1, 10)$ into combined image $(Z_1, \phi_2)$ Similarly, arrow 92 indicates the combination of images $(Z_2, 3)$, $(Z_2, 7)$, and $(Z_2, 10)$ into combined image $(Z_2, \phi_2)$. Arrow 94 indicates the combination of image $(Z_1, \phi_2)$ with image $(Z_2, \phi_2)$ to generate combined image $(Z_{1-2}, \phi_2)$. The value $\phi_2$ indicates that the combined images correspond to a second phase of the periodic motion of body 15.

Next, in step S807, it is determined whether any more correlations exist between any of the first plurality and/or the second plurality of images. If so, flow returns to step S805 and continues as described above to generate a next combined image. If not, flow continues to step S808 to generate an animation based on each combined image.

Figure 11:
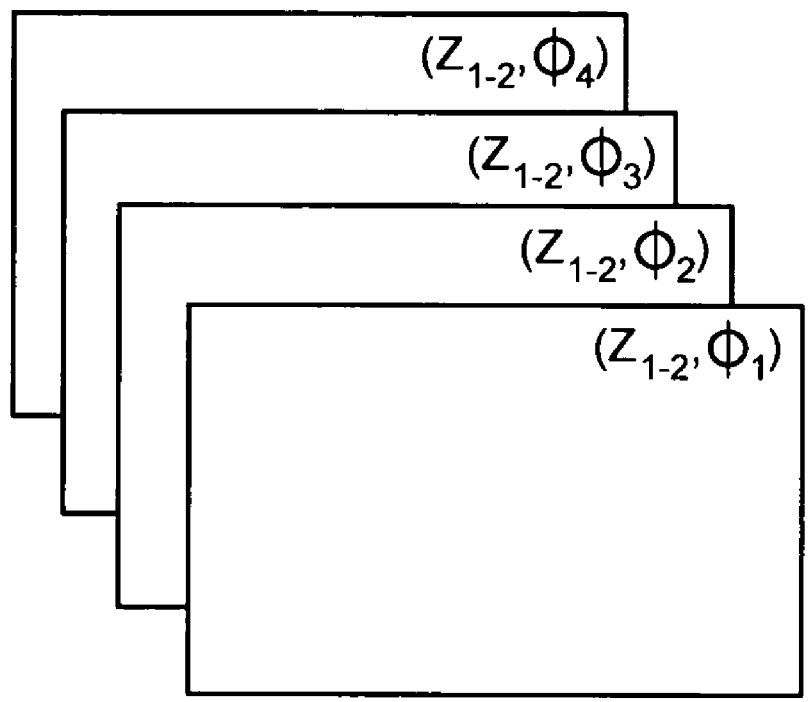
FIG. 11 depicts an animation composed of a plurality of combined images according to some embodiments.

FIG. 11 illustrates an animation that is generated according to some embodiments of step S808. FIG. 11 shows two combined images in addition to combined images $(Z_{1-2}, \phi_1)$ and $(Z_{1-2}, \phi_2)$ of the present example. Accordingly, flow returned to step S805 from step S807 twice in order to generate the additional two combined images.

The FIG. 11 images may be used to generate an animation in some embodiments because the images illustrate a same portion of a body (i.e., the first portion and the second portion) at different phases of its periodic motion. The images may therefore be displayed sequentially to provide an animation of the same portion of the body.

According to some embodiments, a third plurality of images of a third portion of the body may be acquired, with the third portion including a portion of the second portion such as overlap portion 70 of FIG. 7. As generally described above, a correlation may be determined between at least one of the second plurality of images and at least one of the third plurality of images and a combined image may be generated based thereon. The correlation may be determined by determining that the overlap portion is substantially identically represented in the at least one of the second plurality of images and the at least one of the third plurality of images. The combined image may also be associated with the first phase if the at least one of the second plurality of images is identical to the at least one of the second plurality of images identified in step S803.

Therefore, process steps 800 may be altered to acquire a plurality of images for overlapping portions of an entire volume of interest. A combined image of the entire volume may then be generated for each phase of motion. The images may be displayed sequentially over time to provide a four-dimensional representation of the volume undergoing periodic motion.

Figure 12:
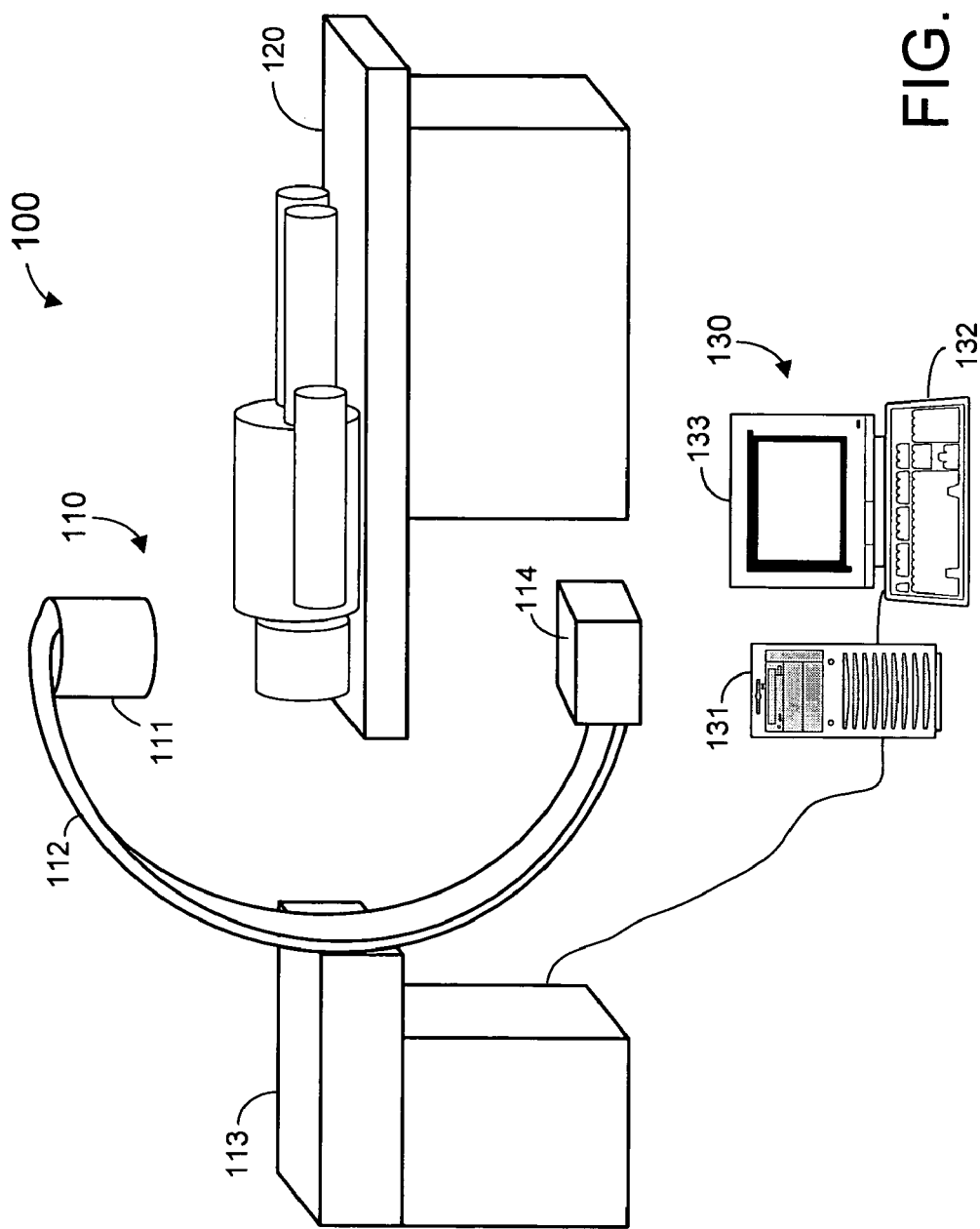
FIG. 12 is a diagram illustrating an image acquisition system according to some embodiments.

FIG. 12 illustrates system 100 to acquire images according to some embodiments. System 100 includes kilovoltage imaging system 110, table 120 and operator station 130.

Imaging system 110 comprises -ray tube 111, C-arm 112, base 113 and imaging device 114. X-ray tube 111 may comprise any suitable device to emit imaging radiation, including but not limited to a Diabolo™ x-ray tube. In some embodiments, X-ray tube 111 emits kilovoltage radiation having energies ranging from 50 to 150 keV. Imaging device 114 may comprise a flat-panel imaging device using a scintillator layer and solid-state amorphous silicon photodiodes deployed in a two-dimensional array. The RID1640, offered by Perkin-Elmer®, Inc. of Fremont, Calif., is one suitable device.

Imaging device 114 may comprise other types of imaging devices. For example, X-ray radiation may also be converted to and stored as electrical charge without use of a scintillator layer. In such imaging devices, x-rays are absorbed directly by an array of amorphous selenium photoconductors. The photoconductors convert the x-rays directly to stored electrical charge that comprises an acquired image of a radiation field. Imaging device 114 may also comprise a CCD or tube-based camera. Such an imaging device may include a light-proof housing within which are disposed a scintillator, a mirror, and a camera.

X-ray tube 111 and imaging device 114 may be coupled to C-arm 112 so as to face one another irrespective of any movement of C-arm 112 with respect to base 113. In this regard, C-arm 112 is slidably mounted on base 113 and can therefore be moved in order to change the position of X-ray tube 111 with respect to table 120. In some embodiments, base 113 also includes a high-voltage generator for supplying power used by X-ray tube 111 to generate kilovoltage radiation. Many C-arm/base configurations may be used in conjunction with some embodiments, including configurations in which base 113 is rotatably mounted to a ceiling of a room containing system 100, configurations in which one C-arm is slidably mounted on another C-arm, and configurations incorporating multiple independent C-arms.

Table 120 supports a body during imaging. Table 120 may be adjustable to assist in positioning a portion of the body between X-ray tube 111 and imaging device 114.

Operator station 130 includes processor 131 in communication with an input device such as keyboard 132 and operator display 133. An operator may operate operator station 130 to acquire images according to some embodiments. Operator station 130 may also or alternatively be used to reconstruct three- or four-dimensional images from projection images acquired by imaging system 110.

Figure 13:
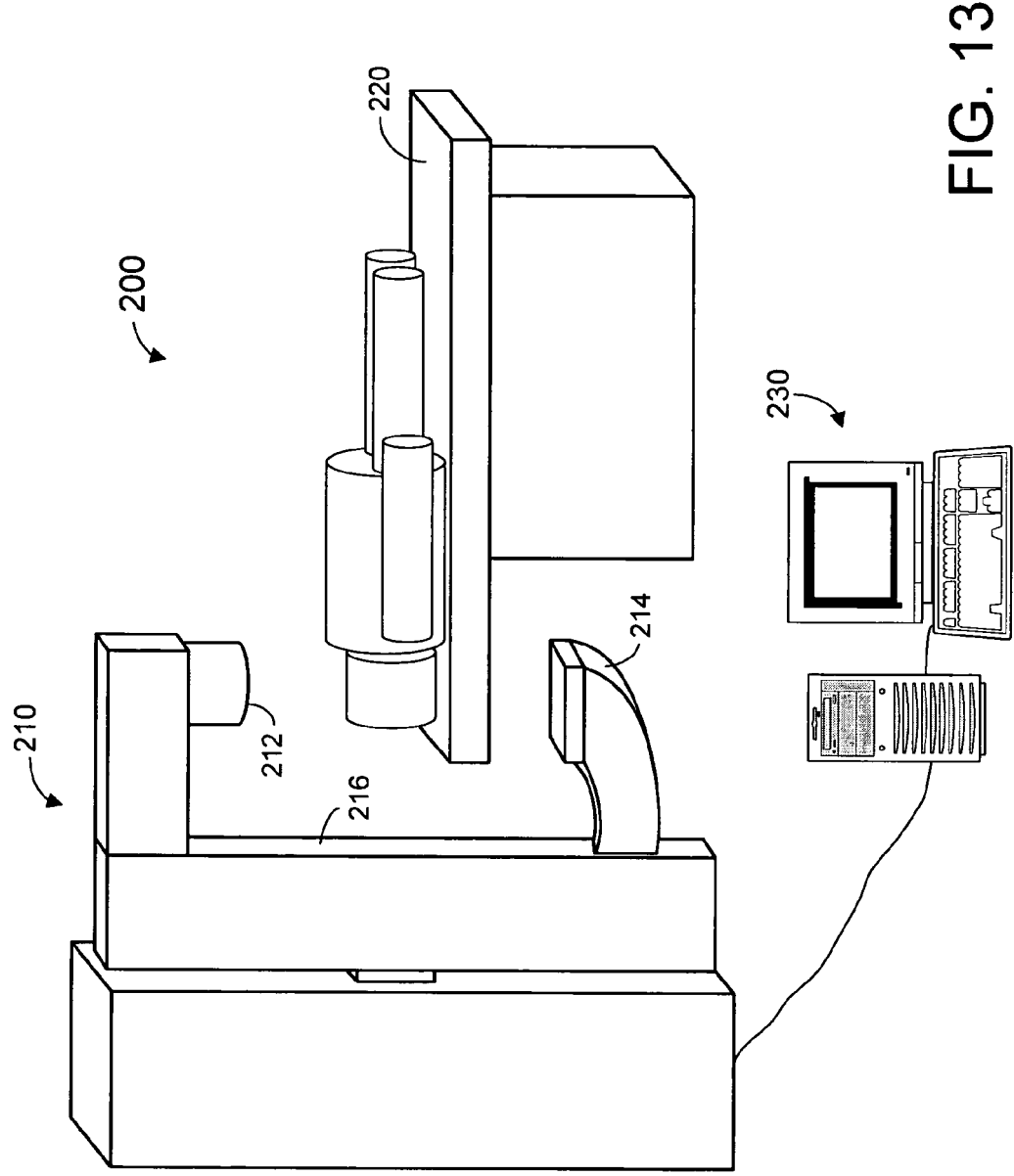
FIG. 13 is a diagram illustrating an image acquisition and/or radiation treatment system according to some embodiments.

FIG. 13 illustrates system 200 to acquire images according to some embodiments. System 200 includes linear accelerator 210, table 220 and operator station 230. Linear accelerator 210 may be used to deliver treatment radiation as well as radiation used to acquire images according to some embodiments. For example, system 200 may be used to acquire images for verification and recordation of a patient position and of an internal patient portal to which radiation is delivered.

Linear accelerator 210 comprises treatment head 212, imaging device 214, and gantry 216. Examples of linear accelerators that may be suitable in some embodiments include the PRIMUS® and ONCOR® systems offered by Siemens Corporation®. Imaging device 214 may comprise any suitable device, including those described above with respect to imaging device 114.

Gantry 216 may be rotated to dispose treatment head 212 and imaging device 214 at different rotational positions with respect to a body lying therebetween. Gantry 216 may be rotated continuously while imaging radiation is emitted from treatment head 212 during an imaging mode, and may be fixed at a particular rotational position when treatment radiation is emitted from treatment head 212.

Table 220 supports a body during imaging and/or radiation treatment. Table 220 may be adjustable to assist in positioning a portion of the body between treatment head 212 and imaging device 214.

An operator may operate operator station 230 to acquire images according to some embodiments. Operator station 230 may also or alternatively be used to determine correlations between, and to generate combined images from, images acquired by linear accelerator 210 according to some embodiments.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
   acquiring a first plurality of images of a first portion of a body undergoing substantially periodic motion;
   acquiring a second plurality of images of a second portion of the body, the second portion comprising a portion of the first portion;
   determining a correlation between at least one of the first plurality of images and at least one of the second plurality of images;
   generating a combined image of the first portion and the second portion based on the at least one of the first plurality of images and the at least one of the second plurality of images, the combined image corresponding to a first phase of the periodic motion;
   acquiring a third plurality of images of a third portion of the body, the third portion comprising a next portion of the second portion;
   determining a correlation between the at least one of the second plurality of images and at least one of the third plurality of images;
   generating a combined image of the second portion and the third portion based on the at least one of the second plurality of images and the at least one of the third plurality of images, the combined image of the second portion and the third portion corresponding to the first phase of the periodic motion.

2. A method according to claim 1, wherein the first plurality of images and the second plurality of images comprise three-dimensional cross-sectional images of the body.

3. A method according to claim 2, wherein the first plurality of images and the second plurality of images are acquired by a computed tomography scanner.

4. A method according to claim 2, wherein the first plurality of images and the second plurality of images are acquired using a linear accelerator.

5. A method according to claim 1, wherein determining the correlation comprises:
   determining that the at least one of the first plurality of images and the at least one of the second plurality of images represent substantially a same phase of the periodic motion.

6. A method according to claim 5, wherein determining the correlation further comprises:
   determining that the portion is substantially identically represented in the at least one of the first plurality of images and the at least one of the second plurality of images.

7. A method according to claim 1, further comprising:
   determining a second correlation between a second at least one of the first plurality of images and a second at least one of the second plurality of images; and
   generating a second combined image of the first portion and the second portion based on the second at least one of the first plurality of images and the second at least one of the second plurality of images, the second combined image corresponding to a second phase of the periodic motion.

8. A method according to claim 7, further comprising:
   generating an animation based on the combined image and on the second combined image, the animation representing the first portion and the second portion undergoing the periodic motion.

9. A method according to claim 7, wherein determining the second correlation comprises:
   determining that the portion is substantially identically represented in the second at least one of the first plurality of images and the second at least one of the second plurality of images.

10. A method according to claim 1, further comprising:
    generating a next combined image based on the combined image of the second portion and the third portion and on the combined image of the first portion and the second portion, the next combined image corresponding to the first phase of the periodic motion.

11. A method according to claim 1, wherein determining the correlation between the at least one of the second plurality of images and the at least one of the third plurality of images comprises:
    determining that the next portion is substantially identically represented in the at least one of the second plurality of images and the at least one of the third plurality of images.

12. A method according to claim 1, further comprising:
    determining a correlation between a second at least one of the second plurality of images and at least one of the third plurality of images; and
    generating a combined image of the second portion and the third portion based on the second at least one of the second plurality of images and the at least one of the third plurality of images, the combined image of the second portion and the third portion corresponding to a second phase of the periodic motion.

13. A method according to claim 12, wherein determining the correlation between the second at least one of the second plurality of images and the at least one of the third plurality of images comprises:
    determining that the next portion is substantially identically represented in the at least one of the second plurality of images and the at least one of the third plurality of images.

14. An apparatus comprising:
    a memory storing processor-executable process steps; and
    a processor in communication with the memory and operative in conjunction with the stored process steps to:
    acquire a first plurality of images of a first portion of a body undergoing substantially periodic motion;
    acquire a second plurality of images of a second portion of the body, the second portion comprising a portion of the first portion;

determine a correlation between at least one of the first plurality of Images and at least one of the second plurality of images;

generate a combined image of the first portion and the second portion based on the at least one of the first plurality of images and the at least one of the second plurality of images, the combined image corresponding to a first phase of the periodic motion;

acquire a third plurality of images of a third portion of the body, the third portion comprising a next portion of the second portion;

determine a correlation between the at least one of the second plurality of images and at least one of the third plurality of images; and generate a combined image of the second portion and the third portion based on the at least one of the second plurality of images and the at least one of the third plurality of images, the combined image of the second portion and the third portion corresponding to the first phase of the periodic motion.

15. An apparatus according to claim 14, wherein the first plurality of images and the second plurality of images comprise three-dimensional cross-sectional images of the body.

16. An apparatus according to claim 15, wherein the first plurality of images and the second plurality of images are acquired by a computed tomography scanner.

17. An apparatus according to claim 15, wherein the first plurality of images and the second plurality of images are acquired using a linear accelerator.

18. An apparatus according to claim 14, wherein determination of the correlation comprises:

determination that the at least one of the first plurality of images and the at least one of the second plurality of images represent substantially a same phase of the periodic motion.

19. An apparatus according to claim 18, wherein determination of the correlation comprises:

determination that the portion is substantially identically represented in the at least one of the first plurality of images and the at least one of the second plurality of images.

20. An apparatus according to claim 14, the processor further operative in conjunction with the stored process steps to:

determine a correlation between a second at least one of the first plurality of images and a second at least one of the second plurality of images; and generate a second combined image of the first portion and the second portion based on the second at least one of the first plurality of images and the second at least one of the second plurality of images, the second combined image corresponding to a second phase of the periodic motion.

21. An apparatus according to claim 20, the processor further operative in conjunction with the stored process steps to:

generate an animation based on the combined image and on the second combined image, the animation representing the first portion and the second portion undergoing the periodic motion.

22. An apparatus according to claim 20, wherein determination of the second correlation comprises:

determination that the portion is substantially identically represented in the second at least one of the first plurality of images and the second at least one of the second plurality of images.

23. An apparatus according to claim 14, the processor further operative in conjunction with the stored process steps to:

generate a next combined image based on the combined image of the second portion and the third portion and on the combined image of the first portion and the second portion, the next combined image corresponding to the first phase of the periodic motion.

24. An apparatus according to claim 14, wherein determination of the correlation between the at least one of the second plurality of images and at least one of the third plurality of images comprises:

determination that the next portion is substantially identically represented in the at least one of the second plurality of images and the at least one of the third plurality of images.

25. An apparatus according to claim 14, the processor further operative in conjunction with the stored process steps to:

determine a correlation between a second at least one of the second plurality of images and at least one of the third plurality of images; and generate a combined image of the second portion and the third portion based on the second at least one of the second plurality of images and the at least one of the third plurality of images, the combined image of the second portion and the third portion corresponding to a second phase of the periodic motion.

26. An apparatus according to claim 25, wherein determination of the correlation between the second at least one of the second plurality of images and the at least one of the third plurality of images comprises:

determination that the next portion is substantially identically represented in the at least one of the second plurality of images and the at least one of the third plurality of images.

* * * * *